United States Patent [19]

Muraski et al.

[11] Patent Number: 5,093,782
[45] Date of Patent: Mar. 3, 1992

[54] REAL TIME EVENT DRIVEN DATABASE MANAGEMENT SYSTEM

[75] Inventors: William C. Muraski, Elizabethton; William F. Raines, Johnson City, both of Tenn.

[73] Assignee: Texas Instruments Incorporated, Dallas, Tex.

[21] Appl. No.: 522,615

[22] Filed: May 14, 1990

Related U.S. Application Data

[63] Continuation of Ser. No. 132,498, Dec. 14, 1987, abandoned.

[51] Int. Cl.⁵ .................... G06F 15/40; G06F 15/20; G06F 15/46
[52] U.S. Cl. .................. 395/600; 364/222.81; 364/222.82; 364/267.2; 364/282.1; 364/283.4; 364/286; 364/DIG. 1
[58] Field of Search ... 364/900 MS File, 200 MS File, 364/300

[56] References Cited

U.S. PATENT DOCUMENTS

| | | | |
|---|---|---|---|
| 4,468,732 | 8/1984 | Raver | 364/200 |
| 4,498,145 | 2/1985 | Baker et al. | 364/900 |
| 4,631,664 | 12/1986 | Bachman | 364/200 |
| 4,631,673 | 12/1986 | Haas et al. | 364/300 |
| 4,731,739 | 3/1988 | Woffinden et al. | 364/200 |
| 4,769,772 | 9/1988 | Dwyer | 364/300 |
| 4,774,661 | 9/1988 | Kumpati | 364/900 |
| 4,805,099 | 2/1989 | Huber | 364/300 |
| 4,853,842 | 8/1989 | Thatte et al. | 364/200 |
| 4,866,634 | 9/1989 | Reboh et al. | 364/900 |

Primary Examiner—Stuart N. Hecker
Assistant Examiner—George C. Pappas
Attorney, Agent, or Firm—John A. Haug; James P. McAndrews; Melvin Sharp

[57] ABSTRACT

A method for storing and accessing data in the operation of a program driven computer system for carrying out an industrial process, which system includes a nonvolatile, long access time memory medium and a volatile, short access time memory medium, which method includes: configuring the non-volatile and volatile memory media into a unitary, relational database composed of a plurality of tables each composed of an ordered set of data elements; storing in the non-volatile memory medium a set of data elements which forms at least a first table of the database and which is required by the process infrequently and/or need not be accessed rapidly; storing in the volatile memory medium a set of data elements which forms at least a second table of the database which must be rapidly accessed; executing a plurality of programs in cooperation with data elements forming the database in order to control the process; and establishing communication between the programs and the database via an interface which causes the programs to address any selected table of the database in a manner which is independent of the specific memory medium in which that table is stored.

7 Claims, 2 Drawing Sheets

REAL TIME EVENT DRIVEN DATABASE MANAGEMENT SYSTEM

This application is a continuation of application Ser. No. 07/132,498, filed Dec. 14, 1987, now abandoned.

BACKGROUND OF THE INVENTION

A microfiche appendix is attached to the present specification and forms a part of the present application. This microfiche appendix is entitled DBMS, and consists of a total number of 6 microfiche and a total number of 534 frames.

The present invention relates to a system and method for the storage, manipulation and retrieval of data according to relational concepts to support real-time acquisition of control and management data from processes being monitored and distribution of that data on an event-driven basis.

The invention particularly relates to a database management system (DBMS) of the relational type which is to be employed for controlling ongoing industrial processes.

Known database management systems, constructed primarily for the processing of business data, can be accessed at a speed which permits the retrieval of data elements at a rate of several elements per second. The updating of such a database can require several seconds to complete. A primary reason for these speed limitations is that the primary database storage medium is a nonvolatile storage medium, typically a disk. This is an attractive storage medium because it permits the storage of a large quantity of data inexpensively and compactly.

However, such database systems are not capable of operating at the speeds required by many industrial processes, and particularly processes involving a large number of values which must be monitored and control values which must be derived and transmitted to appropriate controllers. For many industrial processes of this type, the rate at which data values must be read and updated in the database can be of the order of several hundred events per second.

SUMMARY OF THE INVENTION

It is an object of the present invention to provide a database management system which is capable of supporting processes requiring the updating and retrieval of data elements at a high rate.

A system according to the invention is composed physically of at least two data storage sites, these including a volatile, rapidly accessible memory, such as a RAM, and a nonvolatile memory, such as a magnetic disk, in which data can be updated and retrieved at a substantially lower rate. These storage sites are coupled to peripheral devices, including process parameter sensors, controllers, typically programmable controllers, and operating consoles via an interface which is programmed to cause all of the data storage sites to appear to all of the peripheral devices as a single database. The application programs for this system are disposed at the peripheral device side of the interface, so that the programmer need not take into account the manner in which the database is distributed among the storage sites.

DESCRIPTION OF THE PREFERRED EMBODIMENTS

Figure 1:
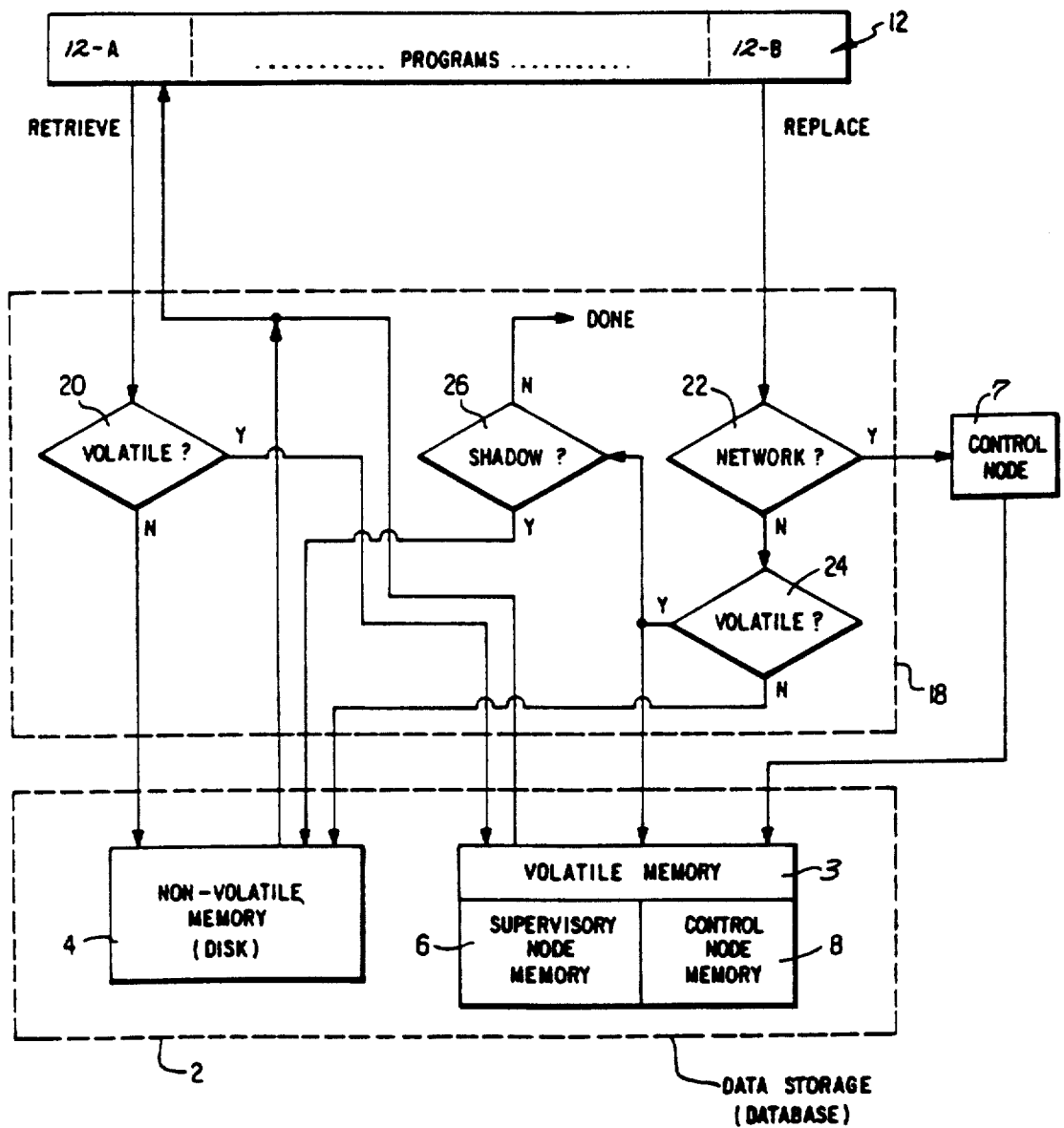
FIG. 1 is a block circuit and logic diagram illustrating the structure of a database management system according to the invention.

Systems according to the present invention employ relational databases. A relational database, in contrast to hierarchical and networked databases, contains information in a tabular format. In this format, the data is present in tables, with each table containing data defined by a certain relation. More specifically, each table contains data describing a particular type of object about which a related application program requires information. Each table is composed of one or more rows, each row being known in the art as a "tuple". Each tuple contains a plurality of individual fields, or columns, each field being known in the art as an "attribute" and containing a respective data element. Such a table bears conceptual similarities to a spreadsheet, where each row (tuple) contains the attributes for a given object and each column is associated with a particular attribute. The grouping of data items together to form the tuples and to construct the tables is governed by well established guidelines known as normalization criteria.

These criteria describe several levels of organizational refinement intended to ensure the integrity of the results of data manipulation operations. The organization imparted to the database by adherence to these guidelines causes manipulation of the database contents to abide by rules applicable to mathematical relations (hence the name "relational"), and thus affords predictable behavior from a properly implemented DBMS. All connections between tables are based on shared key values, rather than on specialized link structures. By virtue of its logical definition, the relational approach offers the greatest independence with respect to the underlying physical storage system and presents the simplest, closest to common-sense approach of the three organizational models. For these data processing reasons, relational database technology finds large acceptance in the data processing world since it allows users to think of the data purely as tables without paying particular attention to the method or location of data storage.

The four basic operations supported by all types of DBMS, relational included, are: retrieve; append; replace; and delete. The retrieve operation, which is usually referred to as a "query", allows read access to any or all attributes in specified tuples. Replace and append are usually referred to as "update" operations, the former allowing existing attribute instances to be updated with new values, and the latter supporting addition of new tuples. The delete operation allows for removal of tuples.

Target tuples for any of these operations are selected on the basis of the values contained in one or more attributes within the tuple. Application programs make use of a high level query language which allows specification of all of the parameters required for invocation of the basic operations, along with a number of auxiliary functions such as sorting and selecting maximum or minimum.

A database according to the present invention is constituted by a plurality of such tables and, according to the invention, some of these tables are stored in one or more volatile memories and the remaining tables are stored in a nonvolatile memory, such as disk. Communication with all of the memories, for purposes of applications programming and data access, takes place via the database management system which, as noted above, is essentially an interface created by appropriate programming which can cooperate with specific applications programming to enable a given process to be controlled by data stored in the database.

The invention can be applied, for example, to process control systems which are constructed to include control nodes associated with specific control devices and supervisory nodes each connected to control the distribution of data with respect to one or more control nodes. Each node may contain a volatile memory which forms part of the database and is coupled to the DBMS interface.

The memory in each supervisory node can be employed for the storage of data items which tend to change at a rapid rate, such as process variables and data relating to the status of process control components. The existing application programs can achieve extremely fast access to these data items, which may be generated by other application programs or placed in a database by a communications subsystem. The control node memory or memories are accessed via the communications subsystem and the results of data collection scans are deposited directly into the database. This provides a window on the process variable values and status values within the framework of the database. Disk storage is utilized for those tables whose contents need not be accessed rapidly and which may require large amounts of storage. This could involve, for example, data relating to historical trends and process configuration data.

Since the memories at the various nodes are typically volatile RAM's, embodiments of the present invention include procedures for preserving these data in the event of a system failure, such as a power outage. This can be achieved by a technique, referred to as "shadowing", by which the tables stored in a node memory are also stored on disk, but in which a data item value is transferred to disk only if there should be a change in that value. This substantially reduces the amount of processor time required to maintain the corresponding tables in memory on the disk. For each table stored in a node memory, this "shadowing" procedure is enabled for selected attributes at the time the database management system is configured and will then be used for all instances of such attribute. Any changes due to DBMS update operations will be reflected in an image, or shadow, file maintained on disk. According to the invention, this process is carried out automatically and is thus "transparent" to the controlling application programs. Because this operation requires disk access, it is selected only for those attributes which are retrieved frequently, must be stored in a nonvolatile memory, and are updated only infrequently.

In further accordance with the invention, special treatment is afforded to data items stored in memory at one or more control nodes. These are commonly referred to as "network data" items. It is primarily desired to reflect the value of these items in the database such that they appear at the application program/management system interface to be truly part of the database, i.e. the application program, or programs, need not treat this data any differently than any other data present in the database.

This approach is applicable to all possible operations on network data items, including update operations. A replacement operation performed on a network data item calls on the communication subsystem as an integral part of the procedure, thus causing the item to be updated in the control node memory prior to the appearance of the update value for that item in the database. Similar to shadowing, the special steps required for updates to network data items are handled entirely within the DBMS and thus, at the application program level, do not appear to be any different than the other tables forming the database.

A DBMS according to the invention is provided with retrieval and update paths which perform the processing that directly supports the treatment of data stored on disk or in volatile memories as a single database, as well as the special handling of network data items. Furthermore, the information required by the DBMS to perform this processing is itself stored in the database in supervisory node memories, thus allowing the fastest possible accessing.

A further feature of the invention relates to the manner in which the DBMS allows application programs to detect changes in the values of data items in the database. This is achieved by providing the capability for an application program which requires notification of changes in a particular data element to define to the DBMS an event that will cause the application program to receive an indication whenever the value of that particular element changes in the database. The application program can define an event with respect to all data elements of concern and then suspend execution of at least certain program phases until any one of those elements experiences a change in value.

Thus, the DBMS can support instructions which will transfer to one or more application programs the value of each selected data element which experiences a change, or which changes by a predetermined amount. This minimizes the quantity of data which must be transferred between the database and an appropriate device, or component, controlled by a particular application program, while assuring that the appropriate device, or component, will be quickly notified if a change occurs in the value of any data element which influences the operation of that device, or component. Devices of the type which may be employed in conjunction with a system according to the present invention include, for example, programmable controllers and process sensors.

This approach to the detection of changes in data element values offers a number of advantages over known procedures, such as those which involve "polling" the database to retrieve each data element, after which the data element is compared with the previous value for that element to detect a change. The latter procedure can consume a large portion of the available CPU bandwidth for the performance of unnecessary queries on the database, especially in a process which is in a steady-state condition.

The approach according to the invention also offers advantages over more advanced prior art procedures which involve defining signals or flags that are set at the end of each scan of the process in order to signal the arrival of new data. While this approach prevents unnecessary polling of the database, it still requires that each potential user of the data be activated to query the database and perform comparisons to detect changes.

The invention could usefully be applied to process control systems in which the flow of data takes place through control nodes each associated with an individual controller, supervisory nodes each connected to one or more control nodes, and higher order nodes.

In such a system, as illustrated in FIG. 1, the storage of data forming the data base 2 is distributed among three physical data storage sites: disk 4; and two sites of volatile memory 3; supervisory node memory 6; and control node memory 8. The first one is a nonvolatile, long access time medium, while the other two are volatile, short access time media.

Supervisory node memory 6 may be used to store data elements which tend to change at a rapid rate, such as process variable and status values.

Application programs 12 comprising programs 12-A and 12-B are afforded extremely fast access to these data elements, which may be generated by other application programs or by a communications subsystem.

Control node memory 8 is accessed via the communications subsystem and contains the results of data collection scans, which are placed directly in database 2 and thus provide a window on process values and statuses within the framework of the database.

Disk memory 4 is utilized for that data which need not be accessed rapidly and which require considerable memory capacity. Data of this type include those providing historical trend displays and configuration tools.

The database management system includes, in addition to database 2, an interface 18 which functions as a buffer between application programs 12 and the data stored in database 2. These data can both drive and be produced by the application programs. Interface 18 is constructed to cause database 2, composed of memories 4, 6 and 8, to function, under control of programs 12, as a single virtual storage, or memory, site. Specifically, interface 18 contains an identification of the physical location of each table forming database 2 so that application programs 12 are freed of the task of providing identification of the physical location of the table or tables which are to be accessed, or addressed.

If, for example, one of the programs, 12-A, of programs 12 is to retrieve a data element or elements from database 2, it sends an appropriate retrieve request to interface 18, which request reaches a decision block 20 that determines the physical location of the table containing the data element or elements in question. On the basis of this determination, the request is routed to the appropriate memory, from which the requested data element or elements are transmitted to program 12-A.

FIG. 1 additionally illustrates the example of a process, associated with the second program 12-B, for the case where special treatment is to be afforded to data elements of a table stored in a control node memory. Program 12-B emits a "replace" instruction which identifies the data element to be replaced and the table in which it exists. This instruction is sent to a decision block 22 which determines whether the table is present in a particular control node memory. In this case, the necessary instruction is sent to the appropriate control node 7, resulting in a change in the value of the designated data element in the associated control node memory 8. If the instruction does not relate to a table contained in a control node memory, operation passes to a decision block 24 which determines whether or not the data element is in a component of the volatile memory. If it is, appropriate instructions are sent to the appropriate volatile memory location. Otherwise, the instruction is sent to replace the designated data element value on disk.

If the replacement is to be made in an element contained in a volatile memory table, this information is additionally provided to a further decision block 26 which determines whether the data element is contained in a table which is to be shadowed on disk. If such is the case, the appropriate data value is also replaced in the corresponding table which is stored on disk. Otherwise, decision block 26 produces an indication that the replacement operation is done.

The processing which directly supports the abovedescribed features is contained in the retrieval and update paths of the DBMS 10. Information required to perform this processing is itself stored in the database in the supervisory node memory portion to allow the fastest possible access.

Process control systems of the type to which the present invention relates can include programs which must be informed of changes in the values of specified data elements. According to an advantageous novel feature of the present invention, a program which must be informed of the current value of a given data element is given the capability of defining to the DBMS an event that will cause that program to be notified only when the value of that particular element in the database changes. Such program can define this event with respect to all data elements that are of concern and then suspend execution until the value of one of those elements actually changes.

Figure 2:
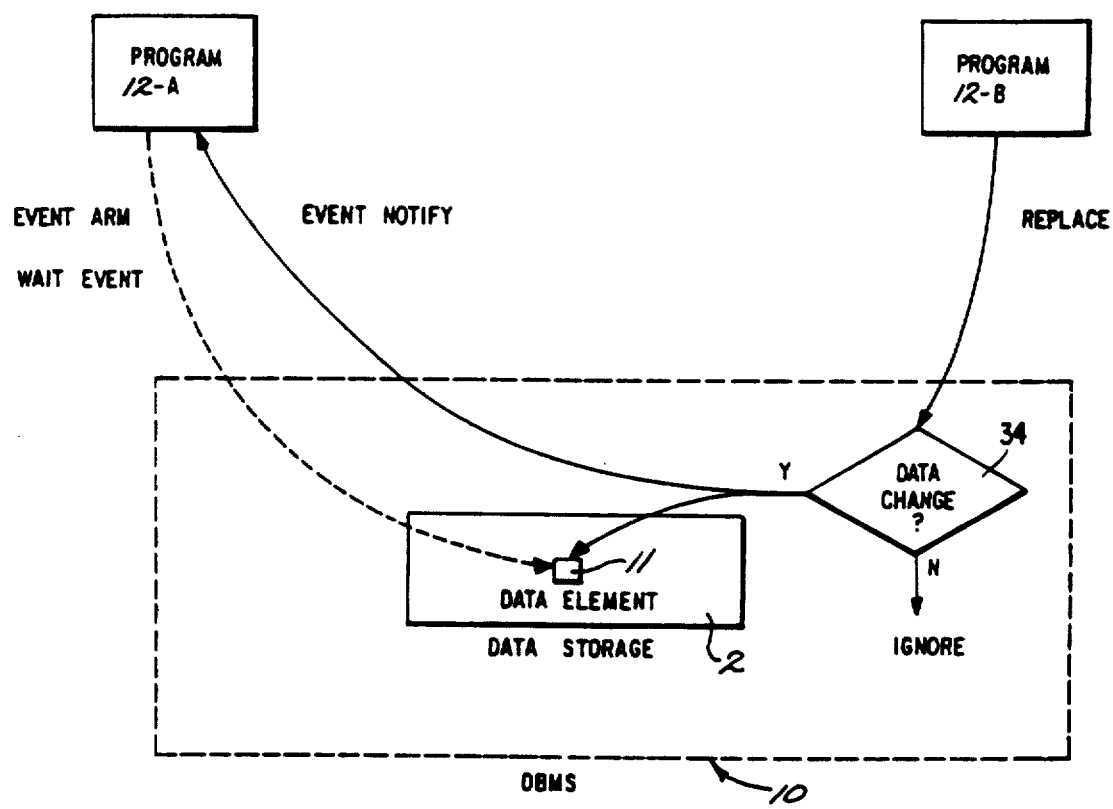
FIG. 2 is a signal flow diagram illustrating operation of event notification in a system according to the invention.

For example, referring to FIG. 2, program 12A must be provided with the current value of one or more data elements 11 whose values are supplied to the DBMS 10 by program 12B. In this case, program 12A is connected to provide an "event arm" instruction which informs the DBMS that program 12A is to be notified whenever the value of any specified data element changes, followed by a "wait event" instruction which indicates that operation of program 12A, or a relevant portion thereof, will be suspended until a change in a designated data element value occurs.

After these instructions have been emitted, each replace instruction generated by program 12B is conducted to a decision block 34 which determines whether the instruction identifies a change in the value of a designated data element. If a change in value is involved, the value of the data element in data storage is appropriately changed, and program 12A is notified that a change has occurred and is supplied with the new value. In response to this information, program 12A resumes execution. If the instruction supplied by program 12B does not represent a change in value of the designated data element, decision block 34 produces an indication that the instruction is to be ignored for purposes of forwarding information to program 12A.

This procedure could be useful, for example, in the case where program 12A serves to display information on an operator's screen. After initial building of the screen and issuance of the event arm and wait event instructions, program 12A can suspend execution until it receives an event notify instruction, indicating that a data element of interest to program 12A has undergone a change in value. Then program 12A can resume execution in order to update the information present on the screen. This procedure, because it minimizes the exchange of data between data storage and an associated program, achieves significant reductions in the demands placed on the CPU of the system.

The invention could be implemented with a UNIX (Trademark of AT&T) operating system and known data storage devices. All programming required to implement interface 18 is contained in the microfiche appendix attached hereto. This appendix contains the programming for performing the functions of interface 18 and programming constituting a specific example of an application of the DBMS according to the invention.

The invention now being fully described, it will be apparent to one of ordinary skill in the art that many changes and modifications can be made thereto without departing from the spirit or scope of the invention as set forth herein.

What is claimed is:

1. A method for storing and accessing data in the operation of a program driven computer system for carrying out an industrial process, which system includes a non-volatile, long access time memory medium and a volatile, short access time memory medium, comprising the steps of: configuring the non-volatile and the volatile memory media into a unitary, relational database composed of a plurality of tables each composed of an ordered set of data elements; storing in the non-volatile memory medium a set of data elements which forms at least a first table of the database and which is required by the process infrequently and/or need not be accessed rapidly; storing in the volatile memory medium a set of data elements which forms at least a second table of the database which must be rapidly accessed; executing a plurality of programs involving data elements forming the database in order to control the process; and establishing communication between the programs and the database via an interface which enables the programs to address any selected table of the database in a manner which is independent of the specific memory medium in which that table is stored, the programs including a first program requiring current values of selected data elements and a second program supplying current values of the selected data elements to a database management system (DBMS), the first program issuing an event arm instruction informing the DBMS that the first program is to be notified whenever the value of any of the selected data elements changes, and a wait event instruction suspending operation of at least a relevant portion of the first program until a change in a selected data element occurs whereby exchange of data between data storage and an associated program is reduced, the system including a control node associated with a control node memory that forms a part of the volatile memory medium and in which at least one of the tables is stored, and said step of establishing communication comprises determining whether the instruction relates to a data element stored in the control node memory and, if so, routing that instruction to the control node memory via the control node, a table being stored both in node memory and in non-volatile memory and placing a selected data element value also in the non-volatile memory but only when there is a change in that value.

2. A method as defined in claim 1 wherein said step of establishing communication comprises enabling the interface to identify and address the memory medium containing the selected table addressed by the programs.

3. A method as defined in claim 1 wherein said step of establishing communication comprises: enabling the interface to determine whether the selected data element is stored in the volatile memory medium and is additionally stored in the non-volatile memory medium, and to effect updating of the data element in both memory media when the determination is positive.

4. A method as defined in claim 1 wherein said step of establishing communication comprises establishing logic linkages which determine, on the basis of a received program instruction identifying a table of the database, the memory medium containing that table.

5. A method as defined in claim 1 wherein the non-volatile memory medium comprises a magnetic medium.

6. A method as defined in claim 5 wherein the volatile memory medium comprises at least one RAM.

7. A method as defined in claim 1 wherein the volatile memory medium comprises at least one RAM.

* * * * *